(12) United States Patent
Kaufmann et al.

(10) Patent No.: US 12,248,200 B2
(45) Date of Patent: Mar. 11, 2025

(54) EYEGLASSES

(71) Applicants: Sandra Kaufmann, Zürich (CH);
Monika Fink, Zürich (CH)

(72) Inventors: Sandra Kaufmann, Zürich (CH);
Monika Fink, Zürich (CH); Eric Hattler, Solothurn (CH)

(73) Assignees: Sandra Kaufmann, Zürich (CH);
Monica Fink, Zürich (CH)

( * ) Notice: Subject to any disclaimer, the term of this patent is extended or adjusted under 35 U.S.C. 154(b) by 721 days.

(21) Appl. No.: 17/426,913

(22) PCT Filed: Jan. 29, 2020

(86) PCT No.: PCT/EP2020/052092
§ 371 (c)(1),
(2) Date: Jul. 29, 2021

(87) PCT Pub. No.: WO2020/157093
PCT Pub. Date: Aug. 6, 2020

(65) Prior Publication Data
US 2022/0099997 A1    Mar. 31, 2022

(30) Foreign Application Priority Data
Jan. 31, 2019   (CH) .................................. 00112/19

(51) Int. Cl.
*G02C 5/00*  (2006.01)
*G02C 5/20*  (2006.01)

(52) U.S. Cl.
CPC ............... *G02C 5/006* (2013.01); *G02C 5/20* (2013.01)

(58) Field of Classification Search
CPC . G02C 5/006; G02C 5/20; G02C 5/14; G02C 5/008; G02C 5/22; G02C 5/2272; G02C 5/229; A45C 11/04; A45C 2011/002; A45F 2200/0541
USPC ....... 351/140, 153, 63, 64, 83, 91, 107, 109, 351/111, 119, 115
See application file for complete search history.

(56) References Cited

U.S. PATENT DOCUMENTS

| 1,440,799 | A | 1/1923 | Ryan |
| 2,323,518 | A | 7/1943 | Cochran |
| 3,533,687 | A | 10/1970 | Herzig |
| 6,375,323 | B1 * | 4/2002 | Yang .................... G02C 5/2227 2/454 |

(Continued)

FOREIGN PATENT DOCUMENTS

| EP | 2 801 857 | 11/2014 |
| FR | 1 039 916 | 10/1953 |

(Continued)

*Primary Examiner* — Travis S Fissel
(74) *Attorney, Agent, or Firm* — Rankin, Hill & Clark LLP

(57) ABSTRACT

An eyeglass frame with an eyeglass front for receiving at least one eyeglass lens, and with a left and right temple, which are pivotably connected to the eyeglass front via a pivot joint connection for holding the eyeglass frame on the head of an eyeglass wearer, wherein the eyeglass front forms at least an upper frame section, wherein the temples can be pivoted relative to the eyeglass front from a position of use into a closing position, in which the temples are arranged above the upper frame section, and vice versa. The temples are arranged in a crossed position relative to each other in their closing position above the upper frame section.

28 Claims, 6 Drawing Sheets

(56) References Cited

U.S. PATENT DOCUMENTS

| | | | | |
|---|---|---|---|---|
| 9,362,968 B1 * | 6/2016 | Haymond | ............ | H04M 1/0281 |
| 9,374,120 B1 * | 6/2016 | Halloran | ................. | A61F 17/00 |
| 2014/0251839 A1 | 9/2014 | Shalon | | |

FOREIGN PATENT DOCUMENTS

| | | | |
|---|---|---|---|
| JP | 2011110123 A | * | 6/2011 |
| WO | 00/37992 | | 6/2000 |
| WO | 2016/007343 | | 1/2016 |

* cited by examiner

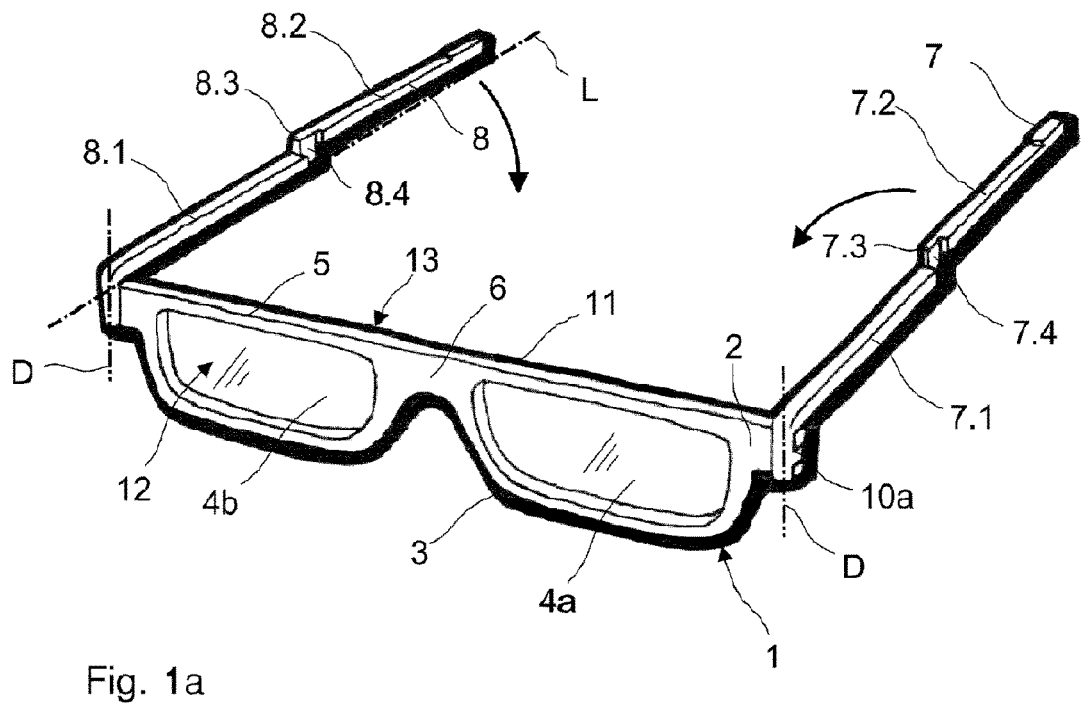
Fig. 1a
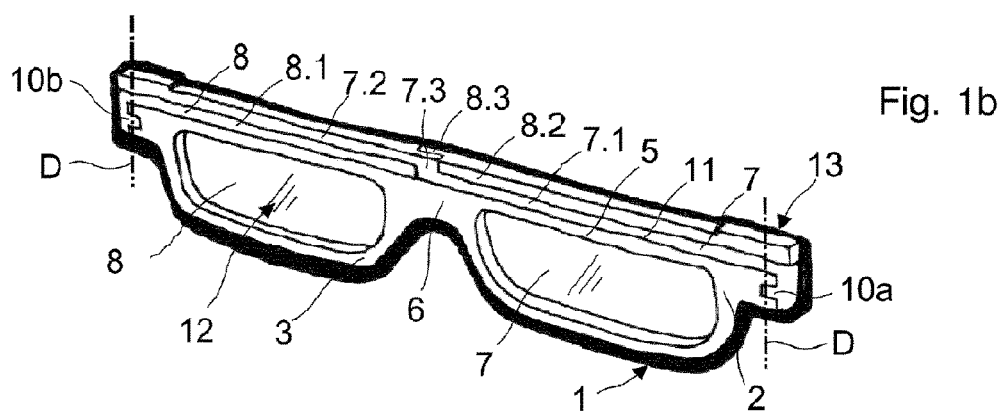
Fig. 1b
Fig. 2a
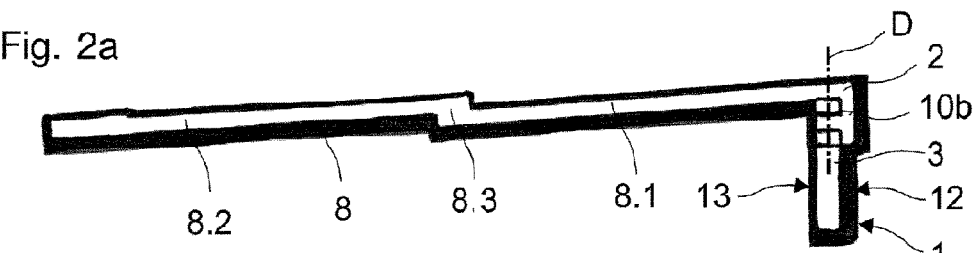
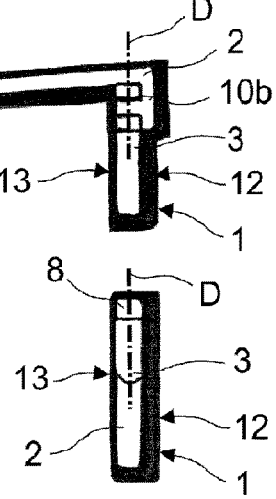
Fig. 2b

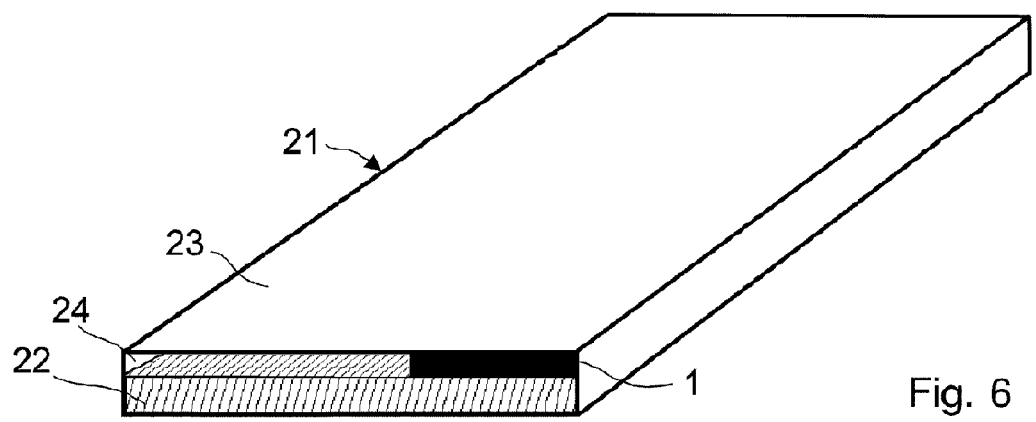
Fig. 6
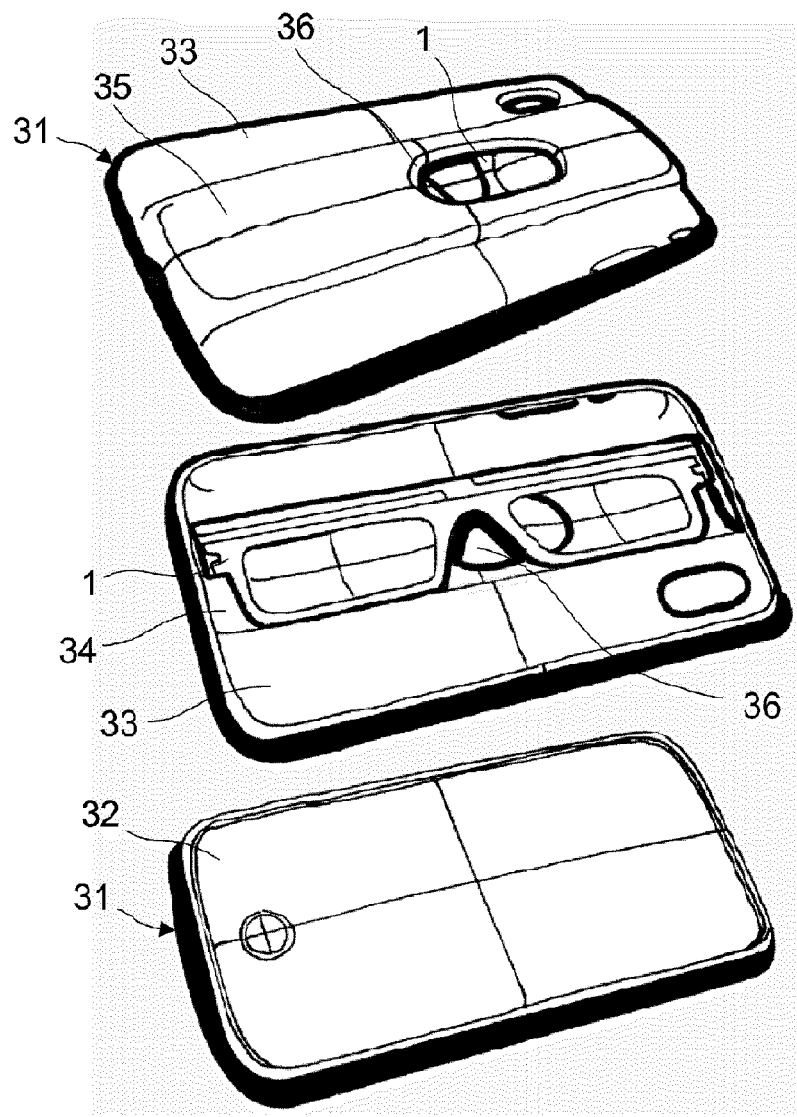
Fig. 7a
Fig. 7b
Fig. 7c

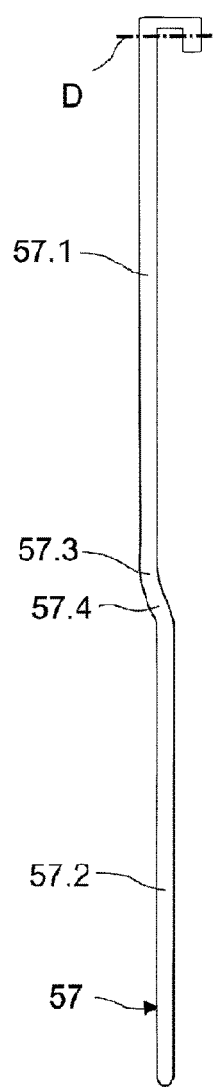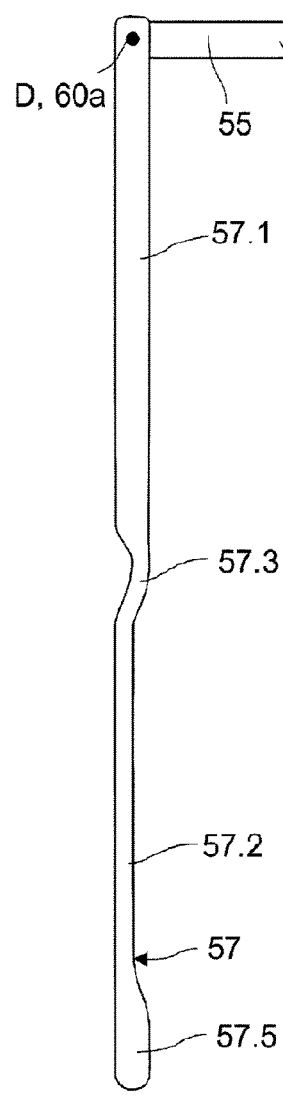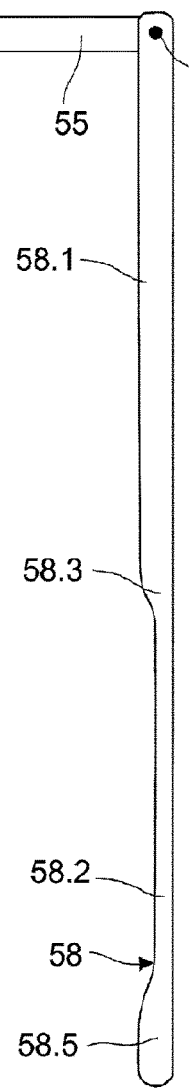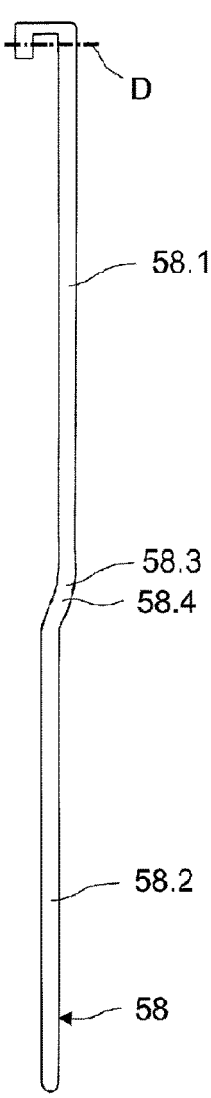

EYEGLASSES

BACKGROUND OF THE INVENTION

Field of the Invention

The invention lies in the technical field of visual aids and concerns an eyeglass frame as well as eyeglasses, including an eyeglass frame according to the invention. Furthermore, the invention also concerns the use of the eyeglasses according to the invention and a set including a protective shell or casing for an electronic handheld device and eyeglasses according to the invention.

Description of Related Art

Electronic handheld devices for displaying information, such as smartphones, cellular phones, tablets or e-book readers are highly popular. Such devices make it possible to procure or retrieve information, such as news, notifications, e-mails, timetables or in general reading matter, pictures and videos, virtually location-independent and in particular whilst travelling.

Such electronic handheld devices are characterised by relatively small displays. As a result, the displays are only suitable for small presentations of information, such as text, i.e., reading matter, pictures or videos.

This has the effect that many people have difficulties to read the information, in particular text information, even if their visual performance is sufficient for everyday life. In other words, many people would only need a visual aid for comfortable reading of text, i.e., reading matter, presented on such small displays.

However, the separate carrying of a visual aid, such as eyeglasses, solely for reading information from the small display of an electronic handheld device is cumbersome. Such eyeglasses easily get lost or cannot be found within a reasonable time as people cannot recall where they did drop or pouch the visual aid the last time.

It may therefore be useful to have eyeglasses which can be carried together with the electronic handheld device. In particular, in may be useful to carry the eyeglasses in a common protective shell or protective case together with the electronic handheld device. However, this requires that the eyeglasses in a closing position of the temples are quite compact.

The patent publication EP 2 801 857 A1 for example discloses eyeglasses with a foldable eyeglass frame with temples that can be positioned by rotational movements into a closing position above the upper frame section of the eyeglasses. However, the eyeglasses are not sufficiently compact in the closing position for being able to be inserted into a protective shell or protective case of an electronic handheld device. Moreover, the pivot joint mechanism with several pivot axis is quite complex and thus expensive in production.

SUMMARY OF THE INVENTION

It is therefore an object of present invention to suggest eyeglasses having a highly compact design in the closing position of the temples.

It is a further object of the present invention to suggest eyeglasses having a design which allows the insertion of the eyeglasses into a slit-shaped compartment of a protective shell or protective case.

It is a further object of the present invention to suggest eyeglasses having a design which ensures that the eyeglasses cannot be crushed in the closing position of the temples.

It is a further object of the present invention to suggest eyeglasses having a design which allows the fixation of the temples in the closing position.

It is a further object of the present invention to suggest eyeglasses having a design which allows the connection of the temples to the front frame with a simple pivot joint connection.

It is a further object of the present invention the keep the manufacturing costs of the eyeglasses as low as possible, and thus to provide inexpensive eyeglasses.

The invention concerns an eyeglass frame with an eyeglass front for receiving at least one eyeglass lense, and with a left and right temple, which are pivotably connected to the eyeglass front via a pivot joint connection for holding the eyeglass frame on the head of an eyeglass wearer.

The eyeglass front forms or has at least an upper frame section. The upper frame section is those part of the eyeglass front which is directed to the eyebrows when wearing the eyeglasses. The upper frame section in particular forms an upper finish, i.e. an upper closure, of the eyeglass front.

The expressions "upper", "above" and "height" used in connection with the frame section or temples have to be understood from the perspective of a normal wearing position.

The eyeglass front in particular is designed for receiving a pair of eyeglass lenses. The at least one eyeglass lense in particular is a prescription lense.

In particular, the pivot joint connections are arranged laterally of the eyeglass front. In particular, the pivot joint connections are arranged in the uppermost, lateral sections of the eyeglass front.

In particular, the upper frame section extends between the lateral pivot joint connections.

The temples can be pivoted relative to the eyeglass front from a position of use, in which the temples in particular are swung out with respect to the eyeglass front, into a closing position, that is to say into a closed position, in which the temples in particular are swung in with respect to the eyeglass front, and in which they are arranged above the upper frame section. Accordingly, the reverse movement from the closing position into the position of use is also possible.

According to the invention the temples are arranged in a crossed position relative to each other in their closing position above the upper frame section.

In particular, the temples in each case have a first longitudinal portion, a second longitudinal portion and a crossing portion, which connects the first and second longitudinal portion with each other.

In particular, the lower edge of the first longitudinal portion is on the height level of the upper edge of the upper frame section or above in any pivoting position.

The eyeglass front has a back side that is facing the face of the eyeglass wearer when wearing the eyeglasses and an opposing front side that is facing away from the face of the eyeglass wearer when wearing the eyeglasses.

The eyeglass front has an upper side that is directed upwards, in particular towards the brow of the eyeglass wearer when wearing the eyeglasses and an opposing under side that is directed downwards, in particular towards the cheeks of the eyeglass wearer when wearing the eyeglasses.

The eyeglass front and in particular the upper frame section have a width. The width corresponds to the distance between the front side and the back side of the eyeglass front. The width can also be considered as thickness in particular in connection with the eyeglasses.

In particular, the width of the upper frame section is constant, i.e., uniform. In particular the width of the eyeglass front is constant, i.e., uniform.

The width of the upper frame section and in particular of the eyeglass front can e.g. be 2 to 6 mm (millimeter), in particular 3 to 5 mm, and most particular 3.5 to 4.5 mm.

In particular, the temples have an inner side which is facing the temple of the eyeglass wearer when wearing the eyeglasses and an opposing outer side, which is facing away from the head of the eyeglass wearer when wearing the eyeglasses, i.e., in the position of use. The temples have a width which corresponds to the distance between the inner side and the outer side of the temples.

The width of the temples, in particular of their longitudinal portions, can be 2 to 6 mm (millimeter), in particular 3 to 5 mm, and most particular 3.5 to 4.5 mm. The width of the first longitudinal portion can be constant, i.e., uniform. The width of the second longitudinal portion can be constant, i.e., uniform. The first and the second longitudinal portion in particular have the same width.

In particular, the width of the first and second longitudinal portion corresponds to the width of the upper frame section and in particular of the eyeglass front.

In particular, the temples have an upper side which is directed upwards and an opposing under side which is directed downwards, i.e., to the ground in an upright position of the eyeglass wearer, when wearing the eyeglasses, i.e. in the position of use. The temples have a height which corresponds to the distance between the upper side and the under side of the temple.

In particular, the temples are connected, i.e., hinged or articulated to the eyeglass front via the first longitudinal portion. This means that the first longitudinal portion at one end is connected to the eyeglass front via a pivot joint connection whereas the crossing portion connects at the other end of the first longitudinal portion.

In this connection the expression "crossing" shall not be reduced to the characteristic of forming a cross. The expression "crossing" shall rather be understood as an arrangement of the temples where in each case a first temple portion of a temple lies underneath a second temple portion of the other temple and a second temple portion of the temple lies above a first temple portion of the other temple, wherein the temple portions of a temple are connected with each other via a crossing portion.

The first and second temple portions in particular correspond to the first and second longitudinal portions as mentioned above.

In this connection the crossing portion in particular forms a displacement in height between the first and second longitudinal portion. In particular, the displacement in height is a displacement along the pivot axis. The displacement can be in a step-like manner.

In particular, the displacement in height corresponds to the height of the first longitudinal portion.

In particular, the maximum width of the pairing of the crossed first and second temples above the upper frame section in the closing position corresponds to the width of the upper frame section or is smaller.

In particular, the temples are designed such that the pairing of the crossed first and second temples above the upper frame section in the closing position does not protrude beyond, i.e., stick out from, the front side and the back side of the upper frame section.

In particular, the temples in each case form a crossing portion.

In particular the crossing portions in each case are arranged centrally with respect to the longitudinal extension of the temples. In particular the crossing portions are designed mirror-inverted relative to each other.

In particular, the crossing portions overlay, i.e., superimpose each other in the crossed closing position of the temples amid the formation of a crossing region.

In particular, the crossing portions, as viewed towards the back or front side of the eyeglass front, are arranged one after the other, i.e., in succession, in the crossed closing position of the temples amid the formation of a crossing region.

In particular, the crossing portions of the temples in each case form a contact surface.

In the crossed position the crossing portions contact each other on the contact surface, in particular in an extensive manner.

In particular, the width of the crossing portions in each case is smaller than the width of the longitudinal portions of the temples connecting to the crossing portions.

In particular, the contact surface is set back with respect to the surface of the longitudinal portions of the temples which are pointing in the same direction.

In particular, the contact surface forms the bottom of a receiving space, which is—amongst others—confined/delimited by the neighbouring longitudinal portions of the temples.

In particular, the crossing portion of the first temple is received in the receiving space of the crossing region of the second temple in the closing position of the temples and vice versa.

In particular, the crossing portion of the first temple is positively received in the receiving space of the second temple in the closing position of the temples, that is to say is received in a precisely fitting manner, and vice versa.

In particular, the crossing portions of the first and second temple lie congruently above each other in the closing position of the temples.

In particular, the height of the crossing portions in each case is larger than the height of the longitudinal portions of the temples connecting to the crossing portions.

In particular, the maximum height of the crossing portions, and in particular of its contact surface, is larger than the height of the first longitudinal portion of the temples.

In particular, the maximum height of the crossing portions, and in particular of its contact surface, is larger than the height of the second longitudinal portion of the temples.

In particular, the maximum height of the crossing portions, and in particular of its contact surface, corresponds to the sum of the height of the first and second longitudinal portion.

As viewed from the back or front side in the closing position, the crossing portions, in particular its contact surface can have a convex quadrilateral basic shape, e.g., can have a rectangular basic shape, a square basic shape, a rhombic basic shape or the basic shape of a parallelogram.

The edges in the transition can be sharp. The edges in the transition can be rounded.

In particular, the eyeglass front is flat, i.e., even. In particular, the eyeglass front has a constant width.

In particular, the flat eyeglass front lies in a common plane together with the pairing of the crossed temples in the closing position.

In particular, the front side of the eyeglass front lies in a first plane and the back side of the eyeglass front lies in a second plane.

In particular, the crossed temples above the upper frame section in the closing position, i.e., the pairing of crossed temples, lie(s) between the first and second plane.

In particular, the eyeglass front and most particular the eyeglasses with the pairing of crossed temples in the closing position above the upper frame section has a constant width.

In particular, the pairing of crossed first and second temples in the closing position forms a cuboid structure with a constant, i.e., uniform height and a constant, i.e., uniform width. The cuboid structure can form recesses, in particular in the crossing region. However, the upper surface and the front and back surface of the pairing of crossed first and second temples can be continuous. In other words, the surfaces do not contain any recesses, with the exception of contact lines between the contacting temples.

In particular, the pivot joint connection and the crossed temples above the upper frame section in the closing position lie between the first and second plane.

In particular, in the closing position of the temples above the upper frame section all elements of the eyeglasses lie between the first and second plane defined by the eyeglass front.

In particular, in the closing position of the temples above the upper frame section the eyeglass frame is flat.

In particular, the upper edge of the upper frame section is straight, i.e., linear. In particular, the upper frame section forms a continuous straight upper edge between the left and right side of the eyeglass frame, in particular between the left and right pivot joint connection on the eyeglass frame. Accordingly, this also includes the nose-bridge.

In particular, the basic cross section of the upper frame section has the shape of a convex quadrilateral. The convex quadrilateral can be rectangular, square, rhombic or parallelogram-shaped.

In particular, the basic cross section of the first and in particular the first and second longitudinal portion of the temples has the shape of a convex quadrilateral. The convex quadrilateral can be rectangular, square, rhombic or parallelogram-shaped.

In particular, the pivot joint connection forms a geometric pivot axis, via which the temples can be pivoted from their position of use into the closing position and vice versa.

This means that the temples in particular can be pivoted, also called swivelled, from their position of use into their closing position by pivoting around only one geometric pivot axis.

In any position of the temples, including the position of use and the closing position, the geometric pivot axis in particular extends perpendicular to the longitudinal axis of the temples.

However, the geometric pivot axis can also enclose an acute angle between 45° and 90° (angle degree), in particular between 60° and 90°, with is of the temples.

In particular, in the position of use the geometric pivot axis encloses an acute angle between 0° and 45° (angle degree), in particular between 0° and 30°, and most particular between 0° and 20° with a plane which is perpendicular to the longitudinal axis of the temples. This angle is also called inclination or pantoscopic angle.

The geometric pivot axis can be formed by a pivot pin which engages in pivot holes provided in the temple and in the lateral side of the eyeglass front.

In particular, the temples, and most particular the crossing portions in each case include at least one functional element for establishing, i.e., creating a releasable, positive connection, i.e., a form fit, of the temples, in particular in the crossing region, in the crossed closing position. The functional element however, can also be arranged in the first and second longitudinal portions of the temples.

The functioning elements can be protrusions or recesses which engage with other functional elements of the counterpart (e.g., between crossing portions or first and second longitudinal portion). In particular a protrusion provided on one temple (e.g., first longitudinal portion or crossing portion of that temple) can interact (e.g., interlock), i.e., form a positive connection, with a recess provided in the other temple (e.g., second longitudinal portion or crossing portion of the other temple).

The functional elements can be designed for establishing a snap-fit. For this, functional elements can be elastically deformable. The snap-fit can be established by interlocking of the functional elements.

In particular, the first and second longitudinal portion of the temples in each case are straight, i.e., linear.

In particular, the first, and in particular also the second longitudinal portion in each case run in parallel with the upper edge of the upper frame section in a crossed closing position.

In particular, the first and second longitudinal portion run parallel to each other, in the closing position of the temples.

In particular, the first longitudinal portion of the temples in each case at least partly, i.e., section-wise, lies or rests against the upper edge of the upper frame section.

In particular, the first longitudinal portion of the temples in each case lies or rests against the upper edge of the upper frame section along their entire length.

In particular, the second longitudinal portion of the temples in each case at least partly, i.e., section-wise, lies or rests against the upper edge of the first longitudinal portion of the other temple.

In particular, the second longitudinal portions of the temples in each case lies or rests against the upper edge of the first longitudinal portion along their entire length.

In particular, the overall width of the pairing of crossing portions being arranged one above the other in the crossing region in the crossed closing position corresponds to the width of the first and in particular also to the width of the second longitudinal portion of the temples.

In particular, the pairing of crossed temples above the upper frame section in the closing position has a constant, i.e., uniform width. The constant, i.e., uniform width occurs in particular along the extension between the pivot joint connections or between the lateral sides of the eyeglass front. The constant, i.e., uniform width in particular also includes the crossing region.

In particular, the pairing of crossed temples above the upper frame section in the closing position has a constant, i.e., uniform height.

According to an embodiment of the invention the crossing portions of the temples as viewed from the back or front side have a curved course in the crossed closing position, in particular with a diagonal intersection, which connect to the first, in particular straight, lower longitudinal portion and to the second, in particular straight, upper longitudinal portion.

The crossing portions in particular have the same height as the first and second longitudinal portion. The height of the crossing portions is defined by a distance measured between the tangents touching the upper and lower edge of the crossing portions and measured at a right angle to the tangents.

The first longitudinal portion in particular has a width which corresponds to the width of the upper frame section.

The second longitudinal portion in particular has a width which is smaller than, and in particular is half of the width of the first longitudinal portion.

The second longitudinal portion in particular has a width which is smaller than, and in particular is half of the width of the upper frame section.

The crossing portions of the temples have a width which in particular is smaller than the width and in particular half of the width of the first longitudinal portion of the temples connecting to the crossing portions.

The crossing portions of the temples have a width which in particular corresponds to the width of the second longitudinal portion of the temples connecting to the crossing portions.

Accordingly, the width of the temples in particular decreases between the first longitudinal portion and the crossing portion in a transition zone which can be part of the crossing region.

In a view from above the crossing portion of one of the temples, e.g., of the left temple, forms a lateral displacement. The lateral displacement effects that the second longitudinal portion, which in particular has a smaller width than the first longitudinal portion and/or the upper frame section, is arranged towards the back side of the upper frame section in the crossed closing position.

The course of the crossing portion of one of the temples, e.g., the right temple, in particular is straight and runs parallel to the first and second longitudinal portion as viewed from above.

The second longitudinal portion of this temple, which in particular has a smaller width than the first longitudinal portion and/or the upper frame section, is arranged towards the back side of the upper frame section in the crossed closing position In case the second upper longitudinal portions have a smaller width than the upper frame section ear portions can be formed at the free end sections of the second longitudinal portions. The ear portions have an increasing width, in particular a bulge in comparison to the main width of the second longitudinal portion. The ear portions serve for a better holding of the temple behind the ear of the user.

The maximal width of said ear portion in particular is not larger than the (maximal) width of the first longitudinal portion and in particular corresponds to the (maximal) width of the first longitudinal portion. The maximal width of said ear portion in particular is not larger than the (maximal) width of the upper frame section and in particular corresponds to the (maximal) width of the upper frame section.

The invention also concerns eyeglasses including at least one eyeglass lense, in particular two eyeglass lenses that is to say a pair of eyeglass lenses, and an eyeglass frame as disclosed above.

In particular, the eyeglass front forms a frame for receiving at least one, in particular two eyeglass lenses.

The expression "glass" in the context of present invention shall not be limited to a glass material. In other words, the eyeglass lenses can, e.g., be made of glass, plastic or a compound of glass and plastic.

In particular, the eyeglass frame is made of plastic. However, the eyeglass frame can also be made of metal, horn, wood or a combination of different materials.

A further aspect of the invention is also the use of the eyeglasses described above for insertion into a slit-shaped, i.e., narrow, compartment of a protective case or protective shell receiving, i.e., housing, an electronic handheld device.

The electronic handheld device, in particular is a mobile device. The electronic handheld device in particular is flat. The electronic handheld device can be a smartphone, cellular phone, a tablet or an e-book reader.

A further aspect of the invention is also a set including a protective shell or protective case for receiving an electronic handheld device, said protective shell or protective case forms a narrow compartment, i.e., space, and further including eyeglasses as described above inserted or insertable into the narrow compartment.

In particular, the compartment for receiving the eyeglasses is slit-shaped, especially when the electronic handheld device, which may form a compartment wall, is brought together with the protective shell or protective case.

In particular, the compartment is formed between a wall of the protective shell or protective case and the electronic handheld device inserted into the protective case or attached onto the protective shell.

In a wall of the protective shell or protective case a longitudinal trough-shaped recess can be formed which represents the compartment for receiving the eyeglasses.

In case of a protective shell the electronic handheld device in particular is attached onto an open extensive front side with the display facing a back wall of the protective shell by means of a snap-on connection that is to say snap fit.

In case of a protective shell the compartment for receiving the eyeglasses in particular is formed in the back wall mentioned above.

It is also possible that the eyeglasses are fastened in the compartment by means of a snap-on connection that is to say snap-fit.

The eyeglasses according to the invention can also be stored in a flat spectacle case which does not require a lot of space for storing and which in particular is not thick and in particular has a constant thickness. Accordingly, the eyeglasses—with or without being stored in a spectacle case as mentioned above—can easily be stored in handbags or briefcases and thus are perfectly suitable for travelling. In particular, said eyeglasses can have the function of spare glasses or emergency glasses for travelling.

BRIEF DESCRIPTION OF THE DRAWINGS

The subject-matter of the invention is hereinafter explained in more detail by way of embodiment examples which are represented in the accompanying figures. In each case in a schematic manner:

FIG. 1a shows a perspective view of eyeglasses according to the invention with the temples in the position of use;

FIG. 1b shows a perspective view of the eyeglasses according to FIG. 1a with the temples in the closing position;

FIG. 2a shows a lateral view of the eyeglasses according to FIG. 1a with the temples in the position of use;

FIG. 2b shows a lateral view of the eyeglasses according to FIG. 1b with the temples in the closing position;

FIG. 6 shows a perspective view of a set including a protective case and eyeglasses with closed temples according to FIGS. 1 to 4;

FIGS. 7a-7c show different perspective views of a set including a protective shell and eyeglasses with closed temples according to FIGS. 1 to 4;

FIGS. 8a-8b shows a view from above of the eyeglasses according to FIG. 10 with the temples in the position of use;

FIGS. 9a-9b shows a lateral view of the temples according to FIG. 8a, 8b;

DETAILED DESCRIPTION OF THE INVENTION

Figure 3A:
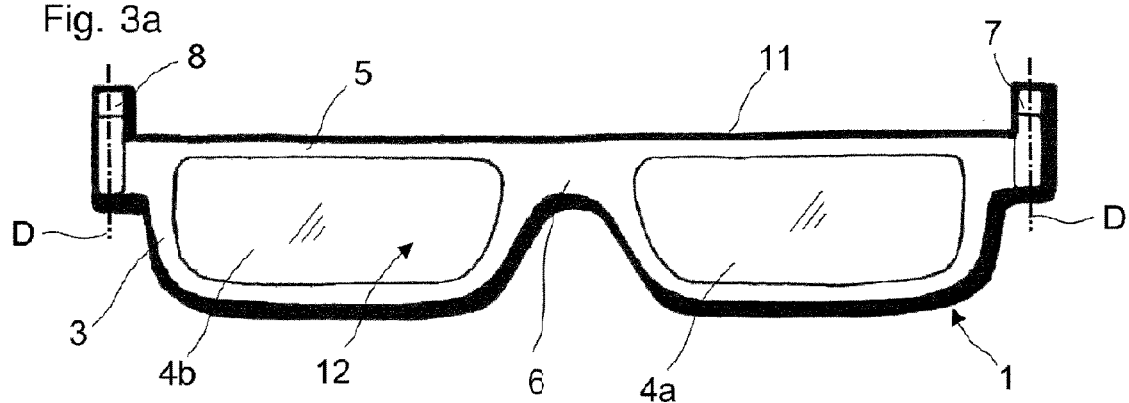
FIG. 3a shows a frontal view of the eyeglasses according to FIG. 1a with the temples in the position of use.
Figure 3B:
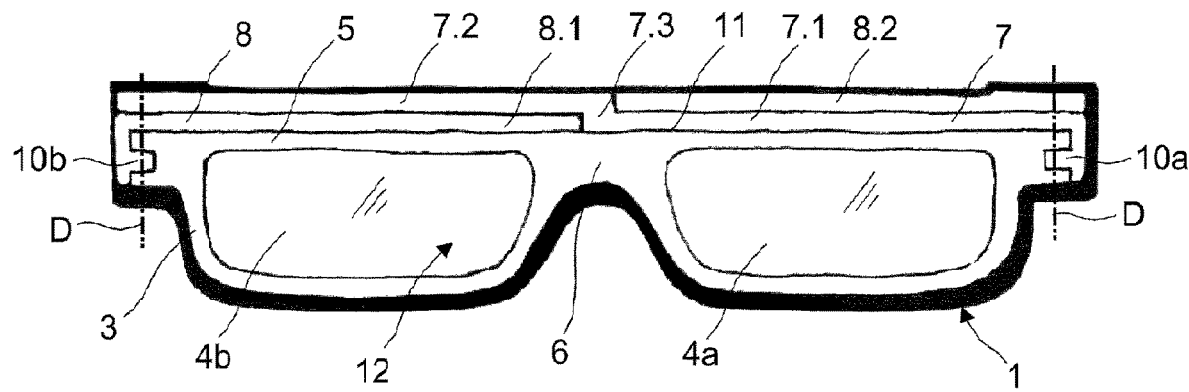
FIG. 3b: shows a frontal view of the eyeglasses according to FIG. 1b with the temples in the closing position.
Figure 4:
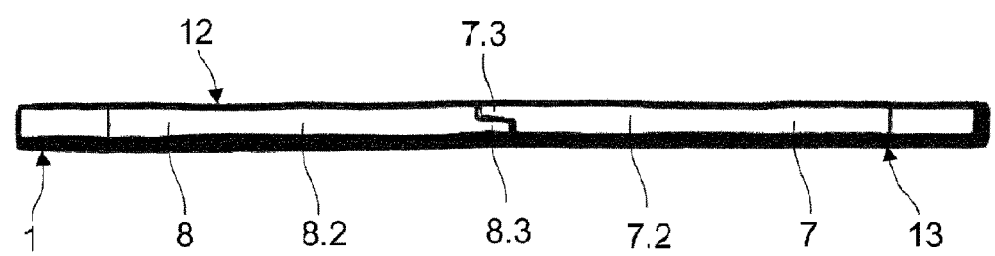
FIG. 4 shows a view from above of the eyeglasses according to FIG. 1b with the temples in the closing position.

Basically, in the figures, the same parts are provided with the same reference numerals. Certain features may not be represented in the figures for the purpose of a better understanding of the invention. The embodiment examples that are described hereinafter are merely exemplary for the subject-matter of the invention and have no limiting effect to the claims.

FIGS. 1 to 4 show a first embodiment of eyeglasses 1. FIGS. 8 to 12 show a second embodiment of eyeglasses 51. The eyeglasses are also called spectacles or simply glasses, according to present invention. The eyeglasses according the two embodiments 1, 51 include an eyeglass frame 2, 52 with an eyeglass front 3, 53, which receives a pair of eyeglass lenses 4a, 4b; 54a, 54b. The eyeglass front 3, 53 includes a nose-bridge 6, 56 which connects the two mounting frame sections, which receive the eyeglass lenses 4a, 4b; 54a, 54b, with each other.

Further, the eyeglass frame 2, 52 includes a left and right temple 7, 8; 57, 58, which are pivotably connected to the eyeglass front 3, 53 via a left and right pivot joint connection 10a, 10b; 60a, 60b. The temples 7, 8; 57, 58 are articulated that is to say hinged to the eyeglass front 3, 53 on lateral sections of the eyeglass front 3, 53.

The eyeglass front 3, 53 forms an upper frame section 5, 55 with an upper edge 11, 61, which forms an upper finish, i.e. closure, of the eyeglass front 3, 53. The upper frame section 5, 55 extends between the lateral pivot joint connections 10a, 10b; 60a, 60b.

The eyeglass front 3, 53 has a front side 12, 62, which points away from the face of the eyeglass wearer, and a back side 13, 63, which is directed towards the face of the eyeglass wearer.

The temples 7, 8; 57, 58 can be pivoted around a geometric pivot axis D relative to the eyeglass front 3, 53 from a position of use (see FIG. 1a, 2a and 3a of the first embodiment and FIGS. 8a and 8b of the second embodiment), in which the temples 7, 8; 57, 58 are swung out with respect to the eyeglass front 3, 53, into a closing position (see figure 1b, 2b, 3b and 4 of the first embodiment and FIGS. 10 and 11 of the second embodiment) in which the temples 7, 8; 57, 58 are arranged above the upper frame section.

As described in more details further below, in their closing position the temples 7, 8; 57, 58 are arranged relative to each other in a crossed position above the upper frame section 5, 55.

The temples 7, 8; 57, 58 in each case include a first longitudinal portion 7.1, 8.1; 57.1, 58.1 with a first end section via which the temples 7, 8; 57, 58 are pivotably connected laterally to the eyeglass front 3, 53. The temples 7, 8; 57, 58 in each case further include a second longitudinal portion 7.2, 8.2 with a first free end section. In longitudinal direction L of the temples 7, 8; 57, 58 the first longitudinal portion 7.1, 8.1; 57.1, 58.1 with its second end section is connected to the second end section of the second longitudinal portion 7.2, 8.2; 57.2, 58.2 via a crossing portion 7.3, 8.3; 57.3, 58.3. In other words, the crossing portion 7.3, 8.3; 57.3, 58.3, which is located centrally, connects the first and the second longitudinal portion 7.1, 8.1; 7.2, 8.2; 57.1, 58.1; 57.2, 58.2 with each other.

The crossing portion 7.3, 8.3; 57.3, 58.3 forms a step that causes a displacement in height of the second longitudinal portion 7.2, 8.2; 57.2, 58.2 relative to the first longitudinal portion 7.1, 8.1; 57.1, 58.1. Displacement in height in particular also means a displacement along the pivot axis. The dimension of the displacement in height corresponds to the height of the first longitudinal portion 7.1, 8.1; 57.1, 58.1. This allows the arrangement of the second longitudinal portion 7.2, 8.2; 57.2, 58.2 above the first longitudinal portion 7.1, 8.1; 57.1, 58.1 of the other temple 7, 8; 57, 58 in the crossed position.

The crossing portions 7.3, 8.3; 57.3, 58.3 in each case form a contact surface 7.4, 8.4; 57.4, 58.4 that contact each other, in particular extensively, in the crossed position.

For taking the closing position the temples 7, 8; 57, 58 are pivoted, i.e. swivelled, around the pivot axis D inward and towards the eyeglass front 3, 53.

The temples 7, 8; 57, 58 take a crossed position above the upper frame section 5, 55 and come to lie with their first longitudinal portions 7.1, 8.1; 57.1, 58.1 on, i.e., against the upper edge 11, 61 of the upper frame section 5, 55.

The temples 7, 8; 57, 58 cross in the crossing region 14, 64 where the crossing portions 7.3, 8.3; 57.3, 58.3 of the temples 7, 8; 57, 58 come together and contact each other on the contact surfaces 7.4, 8.4; 57.4, 58.4. Due to the crossing the crossing portions 7.3, 8.3; 57.3, 58.3 are superimposed, i.e., overlay each other as viewed from the back or front side of the eyeglass front 3, 53.

Due to this the second longitudinal portion 7.2, 8.2; 57.2, 58.2 in each case comes to lie above the first longitudinal portion 7.1, 8.1; 57.1, 58.1 of the other temple 7, 8; 57, 58.

Figure 5A:
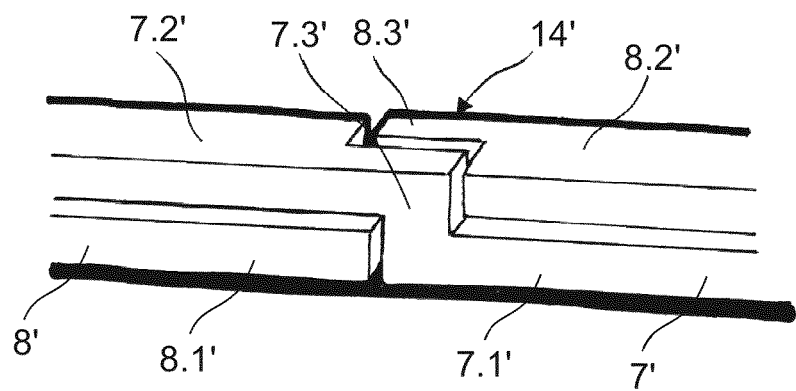
FIG. 5a shows a perspective view of the detail of the crossing region of a further embodiment in the closing position.
Figure 5B:
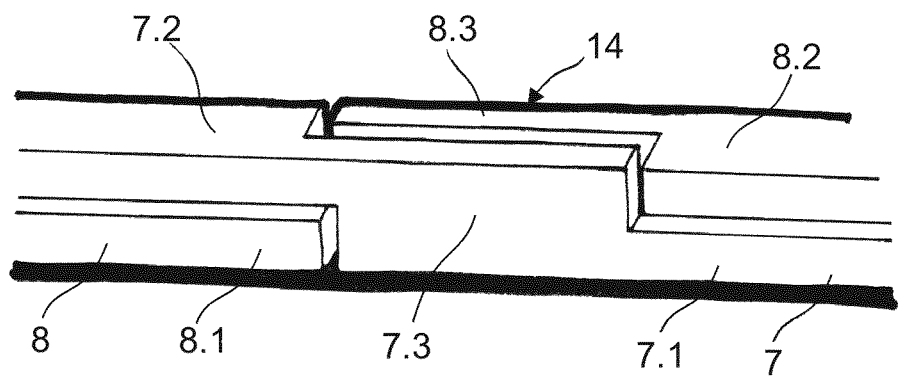
FIG. 5b shows a perspective view of the detail of the crossing region of the embodiment according to FIGS. 1 to 4 in the closing position.

According to the first embodiment the crossing portions 7.4, 8.4 of the temples 7, 8, as viewed from the back or front side in the closing position, have a rectangular basic shape with a height which corresponds to the sum of the heights of the first and second longitudinal component (portion) 7.1, 7.2; 8.1, 8.2 (see FIG. 5b). Due to this, the pairing of crossed first and second temples 7, 8 in the closing position has a constant, i.e., uniform height and in particular a straight upper and lower edge.

The crossing portions 7.4, 8.4 of the temples 7, 8 have a width which is half of the width of the first longitudinal component (portion) 7.1, 8.1, respectively the second longitudinal component (portion) 7.2, 8.2. Due to this, the pairing of crossed first and second temples 7, 8 in the closing position has a constant, i.e., uniform width.

All in all the pairing of crossed first and second temples 7, 8 in the crossed closing position forms a cuboid structure with a constant, i.e., uniform height and a constant, i.e., uniform width.

According to the second embodiment the crossing portions 57.4, 58.4 of the temples 57, 58, as viewed from the back or front side in the crossed closing position, have a curved course with a diagonal intersection which connects with the first, straight lower longitudinal portion 57.1, 58.1 and with the second straight upper longitudinal portion 57.2, 58.2. In present embodiment the crossing portions 57.3, 58.3 have the same height as the first and second longitudinal portion 57.1, 57.2; 58.1, 58.2.

Figure 11:
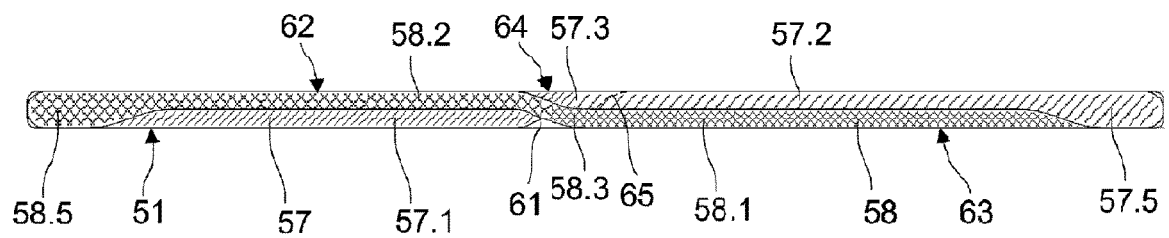
FIG. 11 shows a view from above of the eyeglasses according to FIG. 10 with the temples in the closing position.

The displacement in height of the second longitudinal portion 57.2, 58.2 relative to the first longitudinal portion 57.1, 58.1 established by the crossing portions 57.3, 58.3 is shown in FIG. 11 by means of a change in the hachures. In other words, the hachures of the upper lying second longitudinal portion 57.2, 58.2 is more wide-meshed than the hachures of the underlying first longitudinal portion 57.1, 58.1 of the same type of hachures.

The second longitudinal portions 57.2, 58.2 have a width that is smaller than, and in particular is half of the width of the first longitudinal portion 57.1, 58.1. Further, the width of the second longitudinal portions 57.2, 58.2 is smaller than, and in particular is half of the width of the upper frame section 55.

The crossing portions 57.3, 58.3 of the temples 57, 58 have a width that in particular corresponds to the width of the second longitudinal portion 57.2, 58.2 and that is smaller than, and in particular half of the width of the first longitudinal portion 57.1, 58.1. Accordingly, the width of the temples 57, 58 decreases in the crossing region 64 in a transition zone between the first longitudinal portion 57.1, 58.1 and the crossing portion 57.3, 58.3. In FIG. 11 the dotted line 65 shows the decreasing width of the underlying first longitudinal portion 58.1

In present embodiment at the free end sections of the second longitudinal portions 57.2, 58.2 in each case an ear portion 57.5, 58.5 with an increased width, in particular a bulge, in comparison with the main width of the second longitudinal portion is formed. The maximal width of the ear portion 57.5, 58.5 is not larger than the (maximal) width of the first longitudinal portion 57.1, 58.1 and of the upper frame section 55 and in particular corresponds to the (maximal) width of the first longitudinal portion 57.1, 58.1 and of the upper frame section 55. The ear portion 57.5, 58.5 serves for a better holding of the temple 57, 58 behind the ear of the user.

In a view from above (see FIG. 8*a*) the crossing portion 57.3 of one of the temples 57, in present embodiment the left temple 57, forms a lateral displacement. The lateral displacement effects that the smaller second longitudinal portion 57.2, which has a smaller width than the first longitudinal portion 57.1, comes to lie towards the back side 63 of the upper frame section 55 in the crossed closing position. As a result, the ear portion 57.5 even when having the same width as the underlying first longitudinal portion 58.1 of the right temple 58 does not project beyond said first longitudinal portion 58.1 towards the front side 62.

The course of the crossing portion 58.3 of the right temple 58 is straight and runs parallel to the first and second longitudinal portions 58.1, 58.2 as viewed from above. The smaller second longitudinal portion 58.2, which has a lower width than the first longitudinal portion 58.1, lies towards the back side 63 of the upper frame section 55 in the crossed closing position. As a result, the ear portion 58.5 even when having the same width as the underlying first longitudinal portion 57.1 of the right temple 57 does not project beyond said first longitudinal portion 57.1 towards the front side 62.

Of course, the above described design of the left and right temple 57, 58 can be vice versa.

In contrary to the state of the art the temples 7, 8; 57, 58 according to present invention are pivoted around a single pivot axis from the position of use into the closing position above the upper frame section 5, 55.

The design of the crossing portion 7.3, 8.3; 57.3, 58.3 of the temples 7, 8; 57, 58 is not limited to the shown embodiments.

Figure 5C:
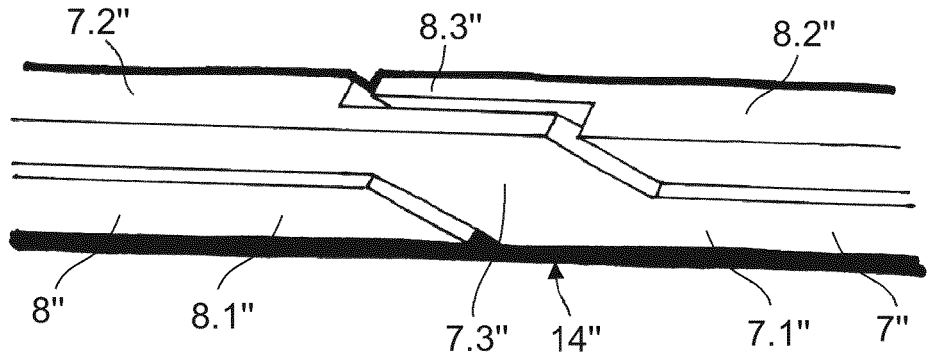
FIG. 5c shows a perspective view of the detail of the crossing region of a further embodiment in the closing position.
Figure 5D:
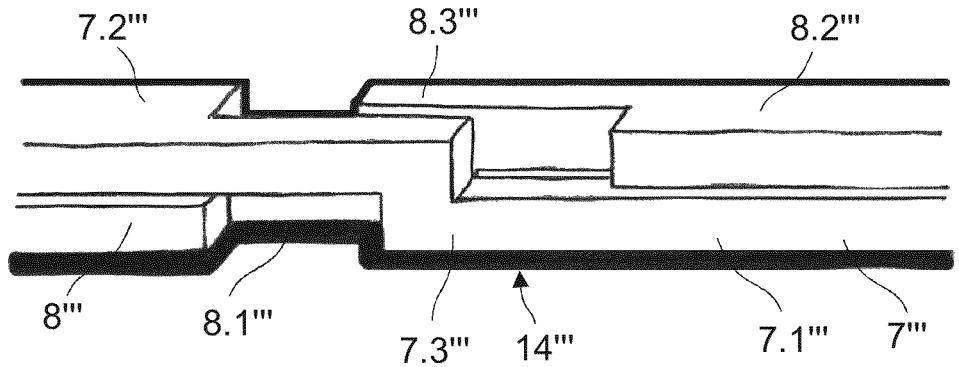
FIG. 5d shows a perspective view of the detail of the crossing region of a further embodiment in the closing position.
Figure 10:
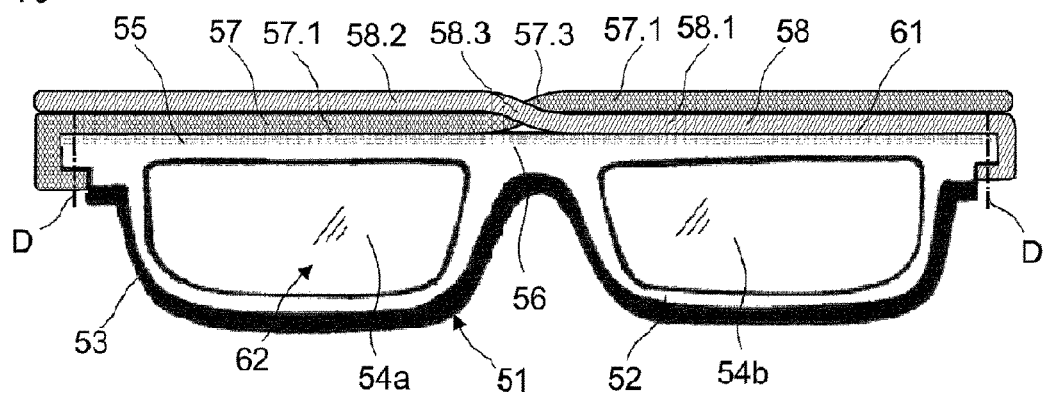
FIG. 10 shows a frontal view of the eyeglasses from the back side with the temples in the closing position.

The FIGS. 5*a*, 5*c* and 5*d* show further designs of crossing portions 7.3', 8.3'; 7.3", 8.3"; 7.3''', 8.3''' of temples 7', 8'; 7", 8"; 7"', 8"'.

What is shown in FIGS. 5*a* to 5*d* is the detail of the crossing region 14, 14', 14", 14''' with the left temple 7, 7', 7", 7"' and its first and second longitudinal portion 7.1, 7.2; 7.1', 7.2'; 7.1", 7.2"; 7.1''', 7.2''' as well as its crossing portion 7.3, 7.3', 7.3", 7.3''' and the right temple 8, 8', 8", 8"' and its first and second longitudinal portion 8.1, 8.2; 8.1', 8.2'; 8.1", 8.2"; 8.1''', 8.2''' as well as its crossing portion 8.3, 8.3', 8.3", 8"'.

The embodiment according to FIG. 5*a* is similar to the embodiment according to FIG. 5*b* with the difference that the extension of the crossing portions 7.3', 8.3' in longitudinal direction L of the temples is smaller and in particular corresponds to the height of the first or second longitudinal portion 7.1', 7.2'; 8.1', 8.2'.

In the embodiment according to FIG. 5*c* the crossing portions 7.3", 8.3" of the temples 7", 8", as viewed from the back or front side in the closing position, are parallelogram shaped.

In the embodiment according to FIG. 5*d* the crossing portions 7.3''', 8.3''' of the temples 7''', 8''', as viewed from the back or front side in the closing position, are S-shaped. This embodiment is characterised that the crossing portions 7.3''', 8.3''' do not lie congruently above each other as it is the case in the embodiments according to FIGS. 5*a*-5*c*. Accordingly, recesses are formed in the crossing region 14''' in the closing position of the temples 7''', 8'''.

The set 21 as shown in FIG. 6 includes a protective case 23 that receives a smartphone 22 and eyeglasses 1 as described above. Between the inserted smartphone 23 and an outer wall of the protective case 23 a slit-shaped compartment 24 is formed into which the eyeglasses 1 with the temples in the closing position are inserted when not in use. In other words, the compartment 24 receives, i.e., houses, the eyeglasses 1. The smartphone 22 and the eyeglasses 1 are inserted into the protective case 23 via an opening on the small front end.

The set 31 as shown in FIGS. 7*a* to 7*c* includes a protective shell 33 with a back wall and an open, extensive front side—as shown in FIG. 7*b*—for receiving a smartphone 32 and eyeglasses 1 as described above. The protective shell 33 forms a longitudinal, trough-shaped compartment 34, which is open to the front side for receiving the eyeglasses 1 with the temples in the closing position. On the back side, i.e., in the back wall of the protective shell 33 as shown in FIG. 7*a* the compartment 34 forms a raised longitudinal ridge 35 that contours the compartment 34 for the eyeglasses 1.

For storing the eyeglasses 1 after use, the eyeglasses 1 are laid into the trough-shaped compartment 34 from the open front side (see FIG. 7*b*). It can be provided that the eyeglasses 1 are fastened in the compartment 34 by means of a snap-on connection.

In a second step the smartphone 32 is laid onto the open, extensive front side of the protective shell 33 with the display facing the protective shell 33 thus covering the compartment 34 receiving the eyeglasses 1. The smartphone 32 is connected to the protective shell 33, e.g., via a snap-on connection that is to say snap-fit.

The eyeglasses 1 are now caught between the protective shell 33 and the smartphone 1 snapped on the protective shell 33 in the closed compartment 34.

For releasing the smartphone 1 and the eyeglasses 1 from the protective shell 33 an opening 36 in the form of a through hole is provided in the protective shell 33 in the region of the back wall forming the compartment 34. The smartphone 32 can be separated from the protective shell 33 on releasing the snap-on connection by pressing a finger through said opening 36 onto the smartphone 1. The same way the eyeglasses can also be separated from the protective shell 33 that is to say moved out of the compartment 34.

Of course, the protective shell 33 as shown in FIGS. 7a to 7c can also be designed as protective case and—amongst a back wall—can also form a front wall. In this case the protective case forms an opening on the small front end for inserting the eyeglasses 1 and the smartphone into the compartment of the protective case, similar to the embodiment according to FIG. 6.

The invention claimed is:

1. An eyeglass frame with an eyeglass front for receiving at least one eyeglass lens, and with left and right temples which are each pivotably connected to the eyeglass front via a pivot joint connection for holding the eyeglass frame on a head of an eyeglass wearer, wherein the eyeglass front forms at least an upper frame section, wherein the left and right temples can be pivoted relative to the eyeglass front between a position of use and a closing position in which the left and right temples are arranged above the upper frame section, wherein each of the left and right temples have a first longitudinal portion, a second longitudinal portion and a crossing portion, said crossing portion connects the first and second longitudinal portions with each other, wherein a width of the crossing portions in each case is smaller than a width of the first longitudinal portion of the left and right temples connecting to the crossing portions, and wherein in the closing position, above the upper frame section, the left and right temples are arranged in a crossed position relative to each other such that the first longitudinal portion of one of the left and right temples lies underneath the second longitudinal portion of the other of the left and right temples and the second longitudinal portion of the one of the left and right temples lies above athe first longitudinal portion of the other of the left and right temples.

2. The eyeglass frame according to claim 1, wherein, for each of the left and right temples, the crossing portion forms a displacement in height between the first and the second longitudinal portions.

3. The eyeglass frame according to claim 1, wherein a maximum overall width of a pairing of the left and right temples above the upper frame section in the closing position is equal to or less than a width of the upper frame section.

4. The eyeglass frame according to claim 1, wherein a width of the crossing portions in each case is smaller than a width of the first and second longitudinal portions of the left and right temples connecting to the crossing portions.

5. An eyeglass frame with an eyeglass front for receiving at least one eyeglass lens, and with left and right temples which are each pivotably connected to the eyeglass front via a pivot joint connection for holding the eyeglass frame on a head of an eyeglass wearer, wherein the eyeglass front forms at least an upper frame section, wherein the left and right temples can be pivoted relative to the eyeglass front between a position of use and a closing position in which the left and right temples are arranged above the upper frame section, wherein each of the left and right temples have a first longitudinal portion, a second longitudinal portion and a crossing portion, said crossing portion connects the first and second longitudinal portions with each other, wherein at least one of the crossing portions of the left and right temples as viewed from above has a curved course, and thus forms a lateral displacement between the first and the second longitudinal portion of the left and right temples in the crossed position, and wherein in the closing position, above the upper frame section, the left and right temples are arranged in a crossed position relative to each other such that the first longitudinal portion of one of the left and right temples lies underneath the second longitudinal portion of the other of the left and right temples and the second longitudinal portion of the one of the left and right temples lies above the first longitudinal portion of the other of the left and right temples.

6. The eyeglass frame according to claim 1, wherein a height of the crossing portions is larger than a height of the first and second longitudinal portions connecting to the crossing portions.

7. The eyeglass frame according to claim 1, wherein in the crossed position, each of the left and right temples comprises at least one functional element for establishing a releasable, positive connection between the left and right temples.

8. The eyeglass frame according to claim 1, wherein the eyeglass frame is flat and lies in a common plane together with a pairing of the left and right temples in the crossed position.

9. The eyeglass frame according to claim 1, wherein the first and second longitudinal portion of the left and right temples in each case is straight.

10. Eyeglasses comprising at least one eyeglass lens and an eyeglass frame according to claim 1.

11. The eyeglass frame according to claim 6, wherein a height of the crossing portions is equal to the overall height of the longitudinal portions of the left and right temples lying above each other in the crossed position of the left and right temples.

12. The eyeglass frame according to claim 5, wherein an overall width of the crossing portions in the crossed position of the left and right temples is equal to or smaller than a width of the upper frame section.

13. The eyeglass frame according to claim 5, wherein a height of the crossing portions is equal to a height of the first and second longitudinal portions connecting to the crossing portions.

14. The eyeglass frame according to claim 5, wherein the crossing portions as viewed from a back side or from a front side have a curved course with a diagonal intersection in the crossed closing position.

15. The eyeglass frame according to claim 5, wherein an upper edge of the upper frame section is straight.

16. The eyeglass frame according to claim 5, wherein in the crossed position the first longitudinal portion and the second longitudinal portion, in each case, run parallel to an upper edge of the upper frame section.

17. The eyeglass frame according to claim 5, wherein in the crossed position the first longitudinal portion of the left and right temples in each case at least partly lies against an upper edge of the upper frame section.

18. The eyeglass frame according to claim 5, wherein in the crossed position the second longitudinal portion of the one of left and right temples at least partly lies against an upper edge of the first longitudinal portion of the other of the left and right temples.

19. The eyeglass frame according to claim 5, wherein an overall width of the crossing portions forming the crossing region in the crossed position is equal to a width of one of:
- the first longitudinal portion;
- the second longitudinal portion;
- the first and second longitudinal portions of the left and right temples.

20. The eyeglass frame according to claim 5, wherein a pairing of crossed left and right temples in the crossed position has a uniform overall width.

21. The eyeglass frame according to claim 5, wherein a width of the second longitudinal portion is smaller than a width of the first longitudinal portion of the left and right temples.

22. The eyeglass frame according to claim 5, wherein the crossing portions of one of the left and right temples as viewed from above has a curved course with a diagonal intersection, and thus forms a lateral displacement between the first and the second longitudinal portion of the one of the left and right temples in the crossed position.

23. The eyeglass frame according to claim 5, wherein, for each of the left and right temples, the crossing portion forms a displacement in height between the first and the second longitudinal portions.

24. The eyeglass frame according to claim 5, wherein a maximum overall width of a pairing of the left and right temples above the upper frame section in the closing position is equal to or less than a width of the upper frame section.

25. The eyeglass frame according to claim 5, wherein the eyeglass frame is flat and lies in a common plane together with a pairing of the left and right temples in the crossed position.

26. The eyeglass frame according to claim 5, wherein the first and second longitudinal portions of the left and right temples in each case is straight.

27. Eyeglasses comprising at least one eyeglass lens and an eyeglass frame according to claim 5.

28. A set comprising eyeglasses according to claim 27 and further comprising a protective shell or protective case for receiving a smartphone, said protective shell or protective case is designed such that it forms a slit-shaped compartment for receiving the eyeglasses when the smartphone is brought together with the protective shell or protective case.

* * * * *